United States Patent [19]

Suzuki et al.

[11] 4,351,598

[45] Sep. 28, 1982

[54] CAMERA

[75] Inventors: Toyotosi Suzuki; Hideo Tamamura, both of Tokyo; Mutsuhide Matsuda, Yokohama, all of Japan

[73] Assignee: Canon Kabushiki Kaisha, Tokyo, Japan

[21] Appl. No.: 253,063

[22] Filed: Apr. 10, 1981

[30] Foreign Application Priority Data

Apr. 14, 1980 [JP] Japan .......................... 55-50243[U]

[51] Int. Cl.³ .............................................. G03B 17/02
[52] U.S. Cl. .................................... 354/288; 354/173
[58] Field of Search ................. 354/173, 202, 288, 224

[56] References Cited

FOREIGN PATENT DOCUMENTS 1042376 10/1958 Fed. Rep. of Germany ...... 354/173

Primary Examiner—John Gonzales

Attorney, Agent, or Firm—Toren, McGeady & Stanger

[57] ABSTRACT

In a camera using 35 mm cartridge-contained film and having incorporated therein an automatic winding and rewinding mechanism, between the cartridge chamber arranged along one of the shorter sides of the exposure aperture of the camera and the outer side panel of the camera housing there are arranged an Albada type finder and a battery chamber capable of accommodating penlight (size AAA) batteries, in superimposed relation, while along the other shorter side of the exposure aperture there is arranged a film takeup chamber. The film advancing and shutter charge mechanisms are arranged in a space between the lower or longer side of the exposure aperture and the bottom panel of the camera housing. The film footage and release mechanisms are arranged in a space between the upper longer side of the exposure aperture and the top panel of the camera housing.

4 Claims, 1 Drawing Figure

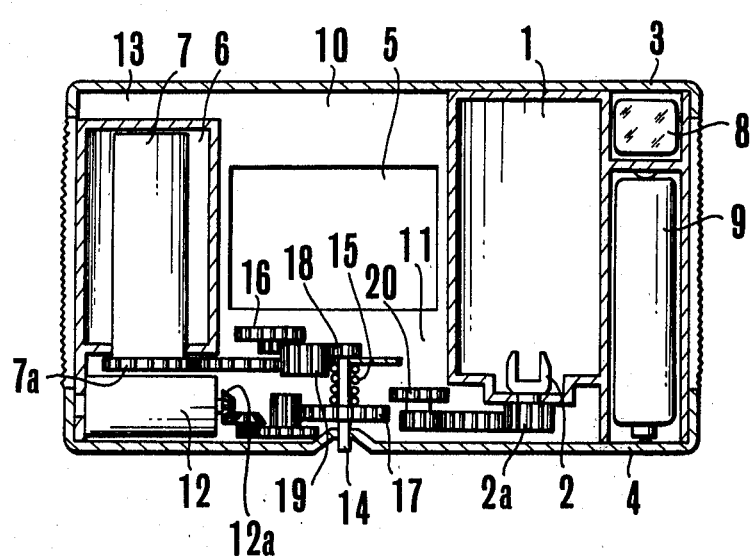

CAMERA

BACKGROUND OF THE INVENTION

1. Field of the Invention

This invention relates to the body structure of a camera using 35 mm roll film and having incorporated therein a mechanism for automatically winding and rewinding the film.

2. Description of the Prior Art

In recent years, in the art of cameras using 35 mm film in cartridges, progress has occurred in the automation of such cameras. At the present time, such cameras have incorporated therein an electric motor drive for automation of the winding and rewinding of the film, an automatic flash exposure control, and other similar advances. However, such cameras are required to be in a form such that a number of unit type dry batteries which operate as the electrical power supply source to the electric motor and the stroboscope be provided in the interior of the camera body, inasmuch as the button type mercury battery or silver battery which is accepted in many of the conventional cameras is found insufficient in capacity.

However, in the conventional type of camera, little consideration has been given to provision of an advantageous layout for incorporating therein the above-described apparatus and the unit type dry batteries in the interior of the camera body. Therefore, such cameras usually involve comparatively large bulk and size of the camera body. Thus, advantageous features such as improved portability are unavoidably sacrificed to some extent.

SUMMARY OF THE INVENTION

The present invention is directed toward overcoming of, particularly regarding a camera of the type using 35 mm cartridge-contained film and having incorporated therein an electric motor drive apparatus for automatic winding and rewinding of the film in order, to provide a body structure capable of incorporating unit type dry batteries of relatively large capacity therein without causing the bulk and size of the camera to be unduly increased. In this regard, the present invention is directed toward provision of a layout of the various portions of the interior of the camera body to enable adaptation to the use of penlight (size AAA) batteries as an electrical power supply source.

BRIEF DESCRIPTION OF THE DRAWING

The single FIGURE of the drawing is a sectional view of one embodiment of a camera body structure according to the present invention.

DETAILED DESCRIPTION OF THE PREFERRED EMBODIMENT

The present invention will be described in greater detail in connection with an embodiment thereof illustrated in the drawing.

It should be understood that the limit of the height of this type camera depends upon the longitudinal length of the 35 mm film cartridge. Since the height of the 35 mm cartrige is about 48 mm, it follows that in order to effect a reduction in the height of the camera to the extent possible, the various members within the camera housing must be laid out with the limitation of the height to a value equal to or smaller than the height of the cartridge.

The drawing shows a vertical sectional view of one embodiment of the camera body structure according to the present invention. For the purpose of clear illustration of the layout of the camera body, an objective lens, a shutter release mechanism and other mechanisms which are not essential to the present invention are omitted in the drawing. In the drawing, 1 is a film cartridge chamber into which a cartridge contained film is to be loaded with the projected end of the cartridge hub pointed downward. 2 is a fork arranged on the bottom of the cartridge chamber 1 to be rendered effective during a rewinding operation. 3 and 4 are respectively an upper cover and a bottom cover portion of the camera housing. 5 is an exposure aperture provided in the camera body; 6 is a film takeup chamber containing a spool 7. 8 is a finder; 9 is an electrical power source or battery chamber. In this instance, the finder 8 is of the Albada type form, and the battery chamber 9 is large enough to accommodate a number of penlight (size AAA) dry batteries. Besides the spaces within the camera housing which the above-mentioned portions occupy, there are further provided a space 10 between the upper cover portion 3 and the aperture 5 and between the cartridge chamber 1 and the takeup spool chamber 6, and a space 11 defined by the bottom cover portion 4, aperture 5 and the takeup spool chamber 6. These spaces 10 and 11 are occupied by other mechanisms than those described above.

In this embodiment, the height of the camera is restricted by the longitudinal length of the film cartridge (about 48 mm). Therefore, the finder which would be otherwise positioned above either the aperture 5, or the cartridge chamber 1 as in the conventional compact camera is transposed beyond the right-hand side of the cartridge chamber 1 at the point of position 8, and it is constructed in the Albada type form as has been mentioned above, thus enabling the space underneath the finder to be used as the battery chamber 9. Another feature is that since the downward-pointed film cartridge requires the rewinding fork 2 to be positioned on the bottom of the chamber 1, the space 11 surrounded by the aperture 5 and the bottom panel 4 of the camera housing can be made larger than the space 10 surrounded by the aperture 5 and the upper panel 3 of the camera housing, thereby making it possible for that space 11 to advantageously accommodate an electric motor 12, a film advancing mechanism, a shutter charge mechanism, and the like as shown in the drawing. Also a driving torque transmission to the fork 2 is advantageously arranged as shown in the drawing. With regard to the construction of the various mechanisms, 12a is a bevel gear fixedly mounted on the output shaft of the electric motor 12 and drivingly connected through a gear train to a gear 17. This gear 17, on the other hand, is fixedly mounted on a rotary shaft 14 so that motion of the motor 12 is transmitted even to a gear 18 fixedly mounted on that shaft 14. 15 is a spring urging the gear 17 to move downwardly relative to the illustrated position which is taken when in the normal operation, or film winding up operation, and where the gear 18 meshes with a gear 19 which is drivingly connected to a sprocket 16 and the spool 7 through respective gear trains. It is noted that 7a is a gear fixedly mounted on the spool 7. Further, 20 is a gear arranged to engage with the gear 17 when the rotary shaft 14 is pushed in the interior of the camera body against the force of the spring 15 to switch to the film rewinding mode, and drivingly connected to a gear 2a fixedly mounted on the opposite end of the fork 2.

With this arrangement, when the rotary shaft 14 is pushed in the camera body, motion of the electric motor 12 is transmitted to the rewinding fork 2, and the film is thereby transported from the takeup spool 7 to the supply spool in the cartridge, while the gear 18 is simultaneously taken out of the connection with the gear 19 to permit the sprocket 16 and the spool 7 to be cut off from the transmission of the driving torque.

Next, the space surrounded by the upper panel 3 of the camera housing and the aperture 5 is used in arranging a mechanism for counting the number of film frames exposed, and also a space between the takeup spool chamber 6 and the upper panel 3 of the camera housing is used in arranging a release mechanism. With these it is made possible to provide a release button and a counter display window in the upper panel 3 at suitable locations.

As has been explained in detail, the present invention functions, in view of the fact that the horizontal length of the Albada type finder is nearly equal to the diameter of the penlight (size AAA) battery, to enable the Albada type finder to be positioned just above the battery chamber in vertical alignment and to effectively utilize the air space resulting from the difference between the sum of the heights of the Albada type finder and the penlight (size AAA) dry battery (about 62 mm) and the height of the film cartridge (about 48 mm) at the locations near the aperture, as the motorized drive mechanism, the shutter charge mechanism, the film counter mechanism and the release mechanism are arranged in that space. Further, the size of said motorized drive mechanism is shortened by employing the spool drive type winding and rewinding mechanism such that the size of the camera in the vertical direction can be made as small as the sum of the heights of the Albada type finder and the penlight (size AAA) battery (about 62 mm), and in the horizontal direction as small as the sum of the widths of the spool chamber, exposure aperture, cartridge chamber and battery chamber which is about 105 mm. Thus, a minimization of the bulk and size of the camera body can be achieved with the advantage that the portability and manageability of this type camera can be remarkably improved.

While a specific embodiment of the invention has been shown and described in detail to illustrate the application of the inventive principles, it will be understood that the invention may be embodied otherwise, without departing from such principles.

What is claimed is:

1. A camera adapted to have loaded therein film in a cartridge and having incorporated therein an electric motorized drive mechanism for automatically winding and rewinding said film, comprising:
an opening window for effecting film exposure formed in a generally central portion of the camera to define at least a pair of shorter sides;
a cartridge chamber arranged along one of the shorter sides of said opening window;
a fork for rewinding the film on said cartridge, said fork being provided on the bottom of said cartridge chamber;
a battery-containing chamber arranged adjacent the side of said cartridge chamber;
a finder defining a single light path, said finder being arranged beside said cartridge chamber and above said batter-containing chamber; and
a film winding chamber arranged along the other shorter side of said opening window.

2. A camera according to claim 1, wherein said camera accommodates an exposed film frame number counting mechanism and a release mechanism above said opening window, and wherein said motorized drive mechanism and a shutter charge mechanism are accommodated below said opening window.

3. A camera according to claim 2, wherein said battery containing chamber accommodates penlight (size AAA) batteries.

4. In a camera adapted to have loaded therein film in a cartridge and having incorporated therein an electric motorized drive mechanism for automatically winding and rewinding said film, said camera including:
a camera casing defining for said camera a top, a bottom, a first side and a second side;
an aperture window for enabling film exposure formed in a generally central portion of said camera to define at least a pair of shorter sides of said aperture window;
a cartridge chamber for receiving therein a film cartridge;
a fork for rewinding film into said cartridge;
a battery chamber adapted to contain batteries therein;
a viewfinder defining a single light path; and
a film winding chamber for receiving therein film unwound from said cartridge;
the improvement wherein the height dimension of said camera from said top to said bottom thereof may be minimized and maintained roughly equivalent to the size of a film cartridge to be loaded into said cartridge chamber, said improvement comprising:
that said cartridge chamber is arranged to extend adjacent said aperture window along one of said shorter sides thereof;
that said rewinding fork is located within said cartridge chamber near the bottom of said camera;
that said battery chamber is arranged alongside said film cartridge chamber on a side thereof opposite said aperture window;
that said viewfinder is located immediately adjacent said cartridge chamber and directly above said battery chamber, said viewfinder and said battery chamber being thereby located one above the other between said top and said bottom of said camera on said first side thereof; and
that said film winding chamber is arranged along the other of said shorter sides of said aperture window on said second side of said camera.

* * * * *